United States Patent
Qi et al.

(10) Patent No.: US 11,283,167 B2
(45) Date of Patent: Mar. 22, 2022

(54) POWER ADJUSTMENT METHOD AND APPARATUS, AND HUMAN BODY SECURITY CHECK DEVICE

(71) Applicants: CHINA COMMUNICATION TECHNOLOGY CO., LTD., Shenzhen (CN); SHENZHEN INSTITUTE OF TERAHERTZ TECHNOLOGY AND INNOVATION, Shenzhen (CN)

(72) Inventors: Chunchao Qi, Shenzhen (CN); Shukai Zhao, Shenzhen (CN); Hanjiang Chen, Shenzhen (CN); Beibei Liu, Shenzhen (CN)

(73) Assignees: CHINA COMMUNICATION TECHNOLOGY CO. LTD., Shenzhen (CN); SHENZHEN INSTITUTE OF TERAHERTZ TECHNOLOGY AND INNOVATION, Shenzhen (CN)

(*) Notice: Subject to any disclaimer, the term of this patent is extended or adjusted under 35 U.S.C. 154(b) by 534 days.

(21) Appl. No.: 16/331,113

(22) PCT Filed: Sep. 6, 2017

(86) PCT No.: PCT/CN2017/100720
§ 371 (c)(1),
(2) Date: Mar. 6, 2019

(87) PCT Pub. No.: WO2018/045964
PCT Pub. Date: Mar. 15, 2018

(65) Prior Publication Data
US 2019/0260121 A1    Aug. 22, 2019

(30) Foreign Application Priority Data

Sep. 7, 2016  (CN) .......................... 201610808565.1

(51) Int. Cl.
*H01Q 3/22* (2006.01)
*G01S 13/89* (2006.01)
(Continued)

(52) U.S. Cl.
CPC .............. *H01Q 3/22* (2013.01); *G01S 13/89* (2013.01); *G01V 8/20* (2013.01); *G06F 17/14* (2013.01)

(58) Field of Classification Search
None
See application file for complete search history.

(56) References Cited

U.S. PATENT DOCUMENTS

| 7,948,428 B2 | 5/2011 | Lovberg et al. |
| 2010/0214150 A1 | 8/2010 | Lovberg et al. |
| 2019/0025421 A1* | 1/2019 | Qi ......................... G01S 13/887 |

FOREIGN PATENT DOCUMENTS

| CN | 101977022 | 2/2011 |
| CN | 102426361 A | 4/2012 |

(Continued)

OTHER PUBLICATIONS

CN105224002 translation (Year: 2016).*
(Continued)

*Primary Examiner* — Whitney Moore
(74) *Attorney, Agent, or Firm* — Maier & Maier, PLLC

(57) ABSTRACT

The invention relates to a power adjustment method and apparatus, and a human body security check device. An adjustable power attenuator is provided in a millimeter wave signal transmitting link of the millimeter wave transceiver. The method comprises: obtaining a current humidity value by detecting the ambient humidity around the millimeter wave transceiver using a preset humidity sensor; determining a target power attenuation value of the adjustable power attenuator according to the current humidity value, the sum (Continued)

of the target power attenuation value and a power attenuation value caused to a millimeter wave signal by the ambient humidity being a constant value; and controlling the adjustable power attenuator to adjust its power attenuation value to be consistent with the target power attenuation value. The solution can reduce radiation hazard while ensuring the definition of an image.

8 Claims, 5 Drawing Sheets

(51) Int. Cl.
  *G01V 8/20* (2006.01)
  *G06F 17/14* (2006.01)

(56) References Cited

FOREIGN PATENT DOCUMENTS

| | | |
|---|---|---|
| CN | 102759753 | 10/2012 |
| CN | 104062620 | 9/2014 |
| CN | 204154908 | 2/2015 |
| CN | 204228978 | 3/2015 |
| CN | 104833969 | 8/2015 |
| CN | 105224002 | 1/2016 |
| CN | 105372647 | 3/2016 |
| CN | 105372665 | 3/2016 |
| CN | 105510911 | 4/2016 |
| CN | 105759269 A | 7/2016 |
| CN | 105938206 A | 9/2016 |
| CN | 106094734 A | 11/2016 |
| CN | 106291740 | 1/2017 |
| CN | 206020692 | 3/2017 |
| CN | 106680814 A | 5/2017 |
| CN | 206339649 U | 7/2017 |
| WO | 2008054865 A2 | 5/2008 |

OTHER PUBLICATIONS

Joan Figueras Tugas, "Privacy and Body Scanners at EU Airports", Nov. 1, 2013 (Nov. 1, 2013), XP055681167, Retrieved from the Internet: URL:https://www.researchgate.net/publication/317369679_Privacy_and_Body_Scanners_at_EU_Airports/, [retrieved on Mar. 31, 2020].

Marcus et al., "Millimeter Wave Propagation; Spectrum Management Implications", IEEE Microwave Magazine, IEEESERVICE Center, Piscataway, NJ, US, vol. 6, No. 2, 1 Jun. 1, 2005, pp. 54-62, XP011137132, ISSN: 1527-3342, DOI: 10.1109/MMW.2005.1491267.

\* cited by examiner

POWER ADJUSTMENT METHOD AND APPARATUS, AND HUMAN BODY SECURITY CHECK DEVICE

CROSS-REFERENCE TO RELATED APPLICATIONS

This application is a national stage entry under 35 U.S.C. 371 of PCT Patent application No. PCT/CN2017/100720, filed Sep. 6, 2017, which claims priority to Chinese patent Application No. 201610808565.1, filed Sep. 7, 2016, the entire contents of each of which are incorporated herein by reference.

TECHNICAL FIELD

The disclosure relates to the technical field of inspection, in particular to a power adjustment method and apparatus, and a human body security check device.

BACKGROUND ART

Millimeter waves are electromagnetic waves with a wavelength of 1-10 mm, and the frequency thereof is 30-300 GHz. In practical engineering applications, the low-end frequency of millimeter waves is often reduced to 26 GHz. Among electromagnetic spectra, millimeter waves are located in the wavelength range where microwaves and far infrared waves overlap, thus having the characteristics of both spectra. Compared with microwaves, the characteristics that a millimeter wave system's narrow-beam and high-gain antennae can be realized easily give the system a high spatial resolution and high anti-interference capabilities; besides, millimeter wave components are small in size and light in weight, so the millimeter wave system is easier to integrate. Compared with infrared waves and lasers, millimeter waves have little attenuation when transmitted in the atmosphere. Natural light and heat radiation sources have little influence on millimeter waves, but millimeter waves are greatly affected by humidity. It is these unique properties that give the millimeter wave technology extensive application prospects, especially in the field of security check.

For a long time, metal security doors have been widely used in human body security check in public places to detect metal articles carried by human bodies, however, they cannot detect nonmetallic articles and weapons such as explosives, nonmetallic knives and liquid dangerous goods. "Naked body scanner" type human body security check imaging devices can effectively detect dangerous articles carried by human bodies based on the property that X-rays can penetrate clothing, human skin and other substances, but the health problems caused by X-rays have long been controversial. According to relevant research reports, the ionizing radiation ability of X-rays can inhibit the growth of biological cells, destroy biological cells or even cause necrosis of biological cells. For the above reasons, many countries require that "naked body scanners" should not be used in public places unless necessary. Therefore, millimeter wave human body scanning imaging security check devices ("human body security check devices" for short) with advantages in terms of rapidity, safety, reliability and privacy protection have been widely used and play an irreplaceable role in human body security check.

The millimeter wave imaging mechanism comprises passive millimeter wave imaging and active millimeter wave imaging. The advantages of a passive millimeter wave imaging system are simple structure and low implementation cost, and the disadvantages thereof are long imaging time and poor imaging resolution. With the development of the millimeter wave device technology and the improvement of the millimeter wave device level, active millimeter wave imaging has been gaining more and more attention. Active millimeter wave imaging includes synthetic aperture imaging and holographic imaging. The method of millimeter wave holographic imaging originates from the principle of optical holography, i.e. based on the coherence principle of electromagnetic waves. A transmitter firstly transmits a highly stable millimeter wave signal to a target to be detected, a receiver receives an echo signal of the target and carries out coherent processing with a highly coherent reference signal to extract the amplitude and phase information of the echo signal, so as to obtain the transmission characteristics at a target point. Finally, the millimeter wave image of the target in a scene can be obtained through data and image processing. A millimeter wave image obtained by active millimeter wave holographic imaging has a high resolution, which can greatly shorten imaging time and realize engineering by matching with mechanical scanning. Therefore, millimeter wave holographic imaging is especially suitable for millimeter wave short-range active imaging. However, millimeter waves are greatly affected by ambient humidity. If a small microwave transmission signal intensity is used, imaging definition will be affected when millimeter waves are greatly attenuated, while if a large microwave transmission signal intensity is used, certain radiation hazard will be caused to human bodies when millimeter waves are slightly attenuated.

BRIEF SUMMARY OF THE INVENTION

The disclosure describes a power adjustment method and apparatus, and a human body security check device, which can reduce radiation hazard while ensuring the definition of an image.

The object of the disclosure is realized through the following technical solution:

A power adjustment method is applied in a human body security check device or an inspection device provided with a millimeter wave transceiver, an adjustable power attenuator is provided in a millimeter wave signal transmitting link of the millimeter wave transceiver, and the method comprises:

obtaining a current humidity value by detecting the ambient humidity around the millimeter wave transceiver using a preset humidity sensor;

determining a target power attenuation value of the adjustable power attenuator according to the current humidity value, the sum of the target power attenuation value and a power attenuation value caused to a millimeter wave signal by the ambient humidity being a constant value; and controlling the adjustable power attenuator to adjust its power attenuation value to be consistent with the target power attenuation value.

A power adjustment apparatus is applied in a human body security check device or an inspection device provided with a millimeter wave transceiver, the power adjustment apparatus comprises a humidity sensor, a power controller and an adjustable power attenuator, and the adjustable power attenuator is provided in a millimeter wave signal transmitting link of the millimeter wave transceiver;

the humidity sensor is configured to detect the ambient humidity around the millimeter wave transceiver to obtain a current humidity value; and the power controller is configured to determine a target power attenuation value of the adjustable power attenuator according to the current humidity value, and control the adjustable power attenuator to adjust its power attenuation value to be consistent with the target power attenuation value, wherein the sum of the target power attenuation value and a power attenuation value caused to a millimeter wave signal by the ambient humidity is a constant value.

A human body security check device comprises a millimeter wave transceiver and a power adjustment apparatus, wherein the power adjustment apparatus comprises a humidity sensor, a power controller and an adjustable power attenuator, the power controller is connected to the humidity sensor and the adjustable power attenuator, and the adjustable power attenuator is provided in a millimeter wave signal transmitting link of the millimeter wave transceiver;

the humidity sensor is configured to detect the ambient humidity around the millimeter wave transceiver to obtain a current humidity value; and the power controller is configured to determine a target power attenuation value of the adjustable power attenuator according to the current humidity value, and control the adjustable power attenuator to adjust its power attenuation value to be consistent with the target power attenuation value, wherein the sum of the target power attenuation value and a power attenuation value caused to a millimeter wave signal by the ambient humidity is a constant value.

According to the exemplary embodiments described above, the current humidity value is obtained by detecting the ambient humidity around the millimeter wave transceiver using the preset humidity sensor; the target power attenuation value of the adjustable power attenuator is determined according to the current humidity value, wherein the sum of the target power attenuation value and the power attenuation value caused to the millimeter wave signal by the ambient humidity being a constant value; and the adjustable power attenuator is controlled to adjust its power attenuation value to be consistent with the target power attenuation value; in this way, the power attenuation value of the adjustable power attenuator is determined based on the current humidity value, and the power attenuation value caused to the millimeter wave signal by the ambient humidity is compensated based on the power attenuation value of the adjustable power attenuator, so that the power radiated to a detected target can be kept constant at a power level which ensures the definition of the image and the minimum radiation hazard, that is, the power attenuation value of the adjustable power attenuator is adaptively adjusted based on the ambient humidity, so that the power radiated to the detected target is a certain fixed value. When applied to the human body security check device, embodiments of the disclosure may reduce radiation hazard to human bodies during detection while ensuring the definition of the image.

DETAILED DESCRIPTION OF THE INVENTION

In order to make the objective, technical scheme and advantages of the disclosure clearer, exemplary embodiments will be described in further detail below with reference to the drawings. It should be understood that the specific exemplary embodiments described herein are only for the purpose of explaining the present disclosure and do not limit the scope of the present disclosure.

In order to facilitate understanding of the scheme of the present disclosure, the principle of the scheme of the present disclosure will first be explained below. Test results show that the attenuation relation between ambient humidity and a millimeter wave signal is $P_{pad1}=ax+b$, wherein $P_{pad1}$ refers to a power attenuation value caused to the millimeter wave signal by the ambient humidity, x refers to the humidity value of the environment (air), a and b are constants, and a is greater than 0. It can be seen that the higher the ambient humidity is, the greater the power attenuation will be during propagation of the millimeter wave signal in the air. In order to reduce radiation hazard as much as possible while ensuring the definition of an image, a power value capable of realizing the minimum radiation hazard can be found within the power range allowing the image to be clear, and the power value is taken as the optimal power value radiated to a detected target (hereinafter referred to as target power value). If the power value radiated to the detected target can be maintained at the target power value regardless of the change of the ambient humidity (i.e., the power radiated to the detected target is kept at a constant value), radiation hazard can be reduced as much as possible while ensuring the definition of the image.

As mentioned above, the higher the ambient humidity is, the greater the power attenuation will be during propagation of the millimeter wave signal in the air. According to the exemplary embodiments of the disclosure, the power of a signal attenuation part caused by the influence of the ambient humidity on the millimeter wave signal is compensated. When the humidity is low, the compensation is correspondingly low, and when the humidity is high, the compensation is correspondingly high. In order to control the compensation amount, an adjustable power attenuator is arranged in the millimeter wave signal transmitting link of the millimeter wave transceiver in the exemplary embodiments of the disclosure; when low compensation is needed, the power attenuation value of the adjustable power attenuator is controlled to be large, and when high compensation is needed, the power attenuation value of the adjustable power attenuator is controlled to be small. Generally, the power attenuation value of the adjustable power attenuator and the power attenuation value caused to the millimeter wave signal by the ambient humidity are controlled to be a constant value.

Exemplary Embodiment 1

Figure 1:
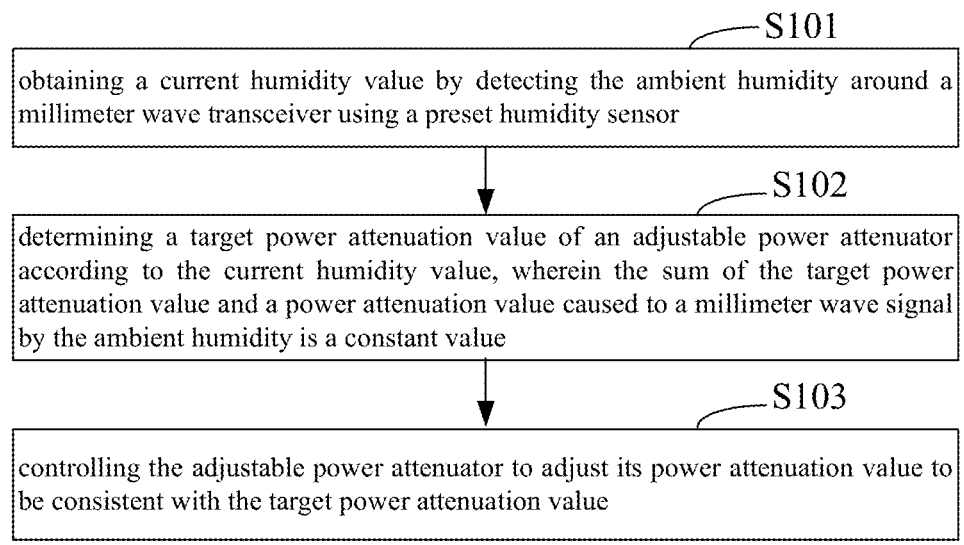
FIG. 1 is a schematic diagram showing the implementation process of a power adjustment method according to exemplary embodiment 1 of the present disclosure.

Exemplary embodiment 1 of the present disclosure provides a power adjustment method, which is applied in a human body security check device with a millimeter wave transceiver or other inspection devices with a millimeter wave transceiver. An adjustable power attenuator is provided in a millimeter wave signal transmitting link of the millimeter wave transceiver. FIG. 1 is a schematic diagram showing the implementation process of the power adjustment method according to exemplary embodiment 1 of the present disclosure. As shown in FIG. 1, the power adjustment method according to exemplary embodiment 1 comprises:

S101, a current humidity value is obtained by detecting the ambient humidity around the millimeter wave transceiver using a preset humidity sensor.

Specifically, a humidity sensor can be arranged in the environment where the millimeter wave transceiver is located, and the ambient humidity around the millimeter wave transceiver can be detected by the humidity sensor to obtain a humidity detection result of the humidity sensor, namely the current humidity value.

Generally, only one humidity sensor is required. In order to improve the accuracy of the humidity detection result, in one exemplary embodiment, there may be a plurality of humidity sensors. The plurality of humidity sensors are installed at different positions in a detection area of the human body security check device/inspection device respectively, and the average value of the humidity values detected by the plurality of humidity sensors can be calculated, and the calculated average value is taken as the current humidity value.

S102, a target power attenuation value of the adjustable power attenuator is determined according to the current humidity value, wherein the sum of the target power attenuation value and a power attenuation value caused to a millimeter wave signal by the ambient humidity is a constant value.

Specifically, the power attenuation value caused to the millimeter wave signal by the ambient humidity may be determined first according to $P_{pad1}=ax+b$, and then the target power attenuation value of the adjustable power attenuator is determined according to $P_{pad1}+P_{pad2}=C$, wherein $P_{pad1}$ refers to the power attenuation value caused to the millimeter wave signal by the ambient humidity, x refers to the current humidity value, $P_{pad2}$ refers to the target power attenuation value, C refers to a total power attenuation value, and both a and b are constants.

Here, the total power attenuation value is equal to the difference between the maximum transmission power of the millimeter wave transceiver and the above-mentioned target power value, which is a constant value, and the total power attenuation value can be preset, wherein the maximum transmission power value refers to the transmission power of the millimeter wave transceiver when the power attenuation value of the adjustable power attenuator is zero.

It can be seen through $P_{pad1}=ax+b$ and $P_{pad1}+P_{pad2}=C$ that there is a one-to-one correspondence relationship between the target power attenuation value and the current humidity value. In order to improve adjustment efficiency, the target power attenuation value can also be determined by looking up a table.

Specifically, the step of determining the target power attenuation value of the adjustable power attenuator according to the current humidity value may comprise: according to the current humidity and the corresponding relations between the current humidity value as well as a preset humidity value and the power attenuation value of the adjustable power attenuator, searching for the target power attenuation value corresponding to the current humidity value.

In other words, the corresponding relation between the humidity value and the power attenuation value of the adjustable power attenuator is established in advance, and after obtaining the current humidity value, the target power attenuation value corresponding to the current humidity value needs to be searched for from the corresponding relation. Here, the corresponding relation is established according to $P_{pad1}=ax+b$ and $P_{pad1}+P_{pad2}=C$.

S103, the adjustable power attenuator is controlled to adjust its power attenuation value to be consistent with the target power attenuation value.

Specifically, an adjustment instruction carrying the target power attenuation value can be sent to the adjustable power attenuator, and after receiving the adjustment instruction, the adjustable power attenuator adjusts its own power attenuation value to be consistent with the target power attenuation value.

According to the exemplary embodiment described above, the current humidity value is obtained by detecting the ambient humidity around the millimeter wave transceiver using the preset humidity sensor; the target power attenuation value of the adjustable power attenuator is determined according to the current humidity value, wherein the sum of the target power attenuation value and the power attenuation value caused to the millimeter wave signal by the ambient humidity is a constant value; and the adjustable power attenuator is controlled to adjust its power attenuation value to be consistent with the target power attenuation value; in this way, the power attenuation value of the adjustable power attenuator is determined based on the current humidity value, and the power attenuation value caused to the millimeter wave signal by the ambient humidity is compensated based on the power attenuation value of the adjustable power attenuator, so that the power radiated to a detected target can be kept constant at a power level which ensures the definition of an image and the minimum radiation hazard, that is, the power attenuation value of the adjustable power attenuator is adaptively adjusted based on the ambient humidity, so that the power radiated to the detected target is a certain fixed value. When applied to the human body security check device, the exemplary embodiments may reduce radiation hazard to human bodies during detection while ensuring the definition of the image.

Exemplary Embodiment 2

Figure 2:
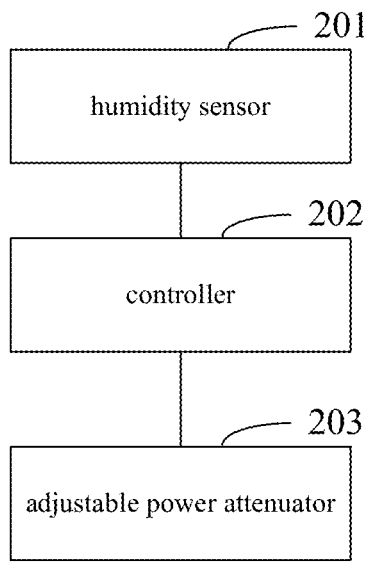
FIG. 2 is a structure diagram of a power adjustment apparatus according to exemplary embodiment 2 of the present disclosure.

According to the power adjustment method of exemplary embodiment 1, exemplary embodiment 2 of the present disclosure provides a power adjustment apparatus, which is applied in a human body security check device or an inspection device provided with a millimeter wave transceiver. FIG. 2 is a structure diagram of the power adjustment apparatus according to exemplary embodiment 2 of the present disclosure. As shown in FIG. 2, the power adjustment apparatus in the present embodiment comprises a humidity sensor 201, a power controller 202 and an adjustable power attenuator 203, the power controller 202 is connected to the humidity sensor 201 and the adjustable power attenuator 203, and the adjustable power attenuator 203 is provided in a millimeter wave signal transmitting link of the millimeter wave transceiver.

The humidity sensor 201 is used for detecting the ambient humidity around the millimeter wave transceiver to obtain a current humidity value; and the power controller 202 is used for determining a target power attenuation value of the adjustable power attenuator according to the current humidity value, and controlling the adjustable power attenuator 203 to adjust its power attenuation value to be consistent with the target power attenuation value, wherein the sum of the target power attenuation value and a power attenuation value caused to a millimeter wave signal by the ambient humidity is a constant value.

In one exemplary embodiment, the power controller 202 may determine the power attenuation value caused to the millimeter wave signal by the ambient humidity according to $P_{pad1}=ax+b$, and determine the target power attenuation value of the adjustable power attenuator according to $P_{pad1}+P_{pad2}=C$, wherein $P_{pad1}$ refers to the power attenuation value caused to the millimeter wave signal by the ambient humidity, x refers to the current humidity value, $P_{pad2}$ refers to the target power attenuation value, C refers to a total power attenuation value, and both a and b are constants; or the power controller 202 may search for the target power attenuation value corresponding to the current humidity value according to the current humidity and the corresponding relations between a preset humidity value and the power attenuation value of the adjustable power attenuator.

It needs to be pointed out that the above description of the power adjustment apparatus provided in exemplary embodiment 2 of the present disclosure is similar to the description of the power adjustment method in exemplary embodiment 1, and the power adjustment apparatus has the beneficial effects of the power adjustment method in exemplary embodiment 1, so no more detailed description here, and for the technical details not disclosed in the power adjustment apparatus provided in exemplary embodiment 2 of the present disclosure, please refer to the description of the power adjustment method in exemplary embodiment 1.

Exemplary Embodiment 3

Figure 3:
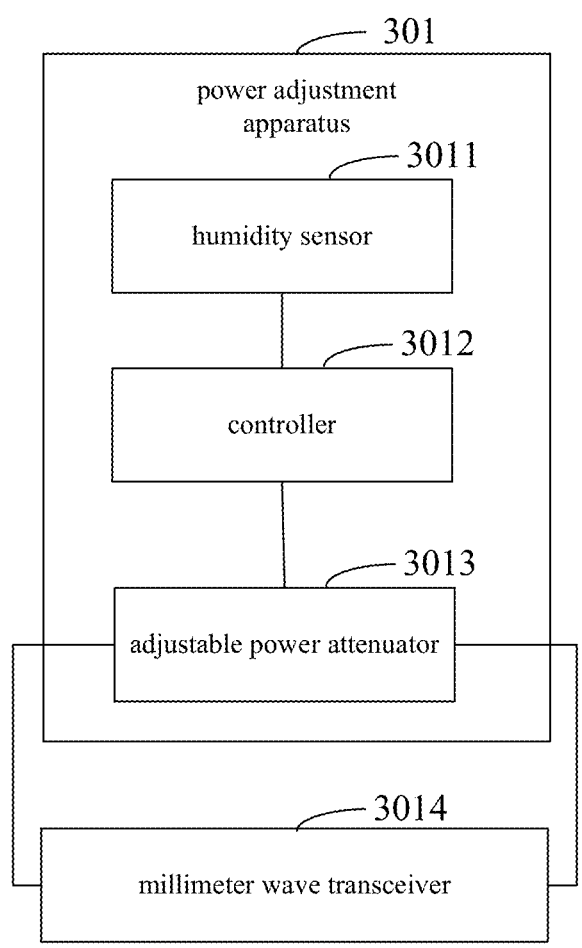
FIG. 3 is a first structure diagram of a human body security check device according to exemplary embodiment 3 of the present disclosure.

According to the power adjustment apparatus of exemplary embodiment 2, exemplary embodiment 3 of the present disclosure provides a human body security check device. FIG. 3 is a structure diagram of the human body security check device according to exemplary embodiment 3 of the present disclosure. As shown in FIG. 3, the human body security check device in the present embodiment comprises a power adjustment apparatus 301 and a millimeter wave transceiver 302, the power adjustment apparatus 301 comprises a humidity sensor 3011, a power controller 3012 and an adjustable power attenuator 3013, the power controller 3012 is connected to the humidity sensor 3011 and the adjustable power attenuator 3013, and the adjustable power attenuator 3013 is provided in a millimeter wave signal transmitting link of the millimeter wave transceiver 302.

The humidity sensor 3011 is used for detecting the ambient humidity around the millimeter wave transceiver to obtain a current humidity value; and the power controller 3012 is used for determining a target power attenuation value of the adjustable power attenuator 3013 according to the current humidity value, and controlling the adjustable power attenuator 3013 to adjust its power attenuation value to be consistent with the target power attenuation value, wherein the sum of the target power attenuation value and a power attenuation value caused to a millimeter wave signal by the ambient humidity is a constant value.

Figure 4:
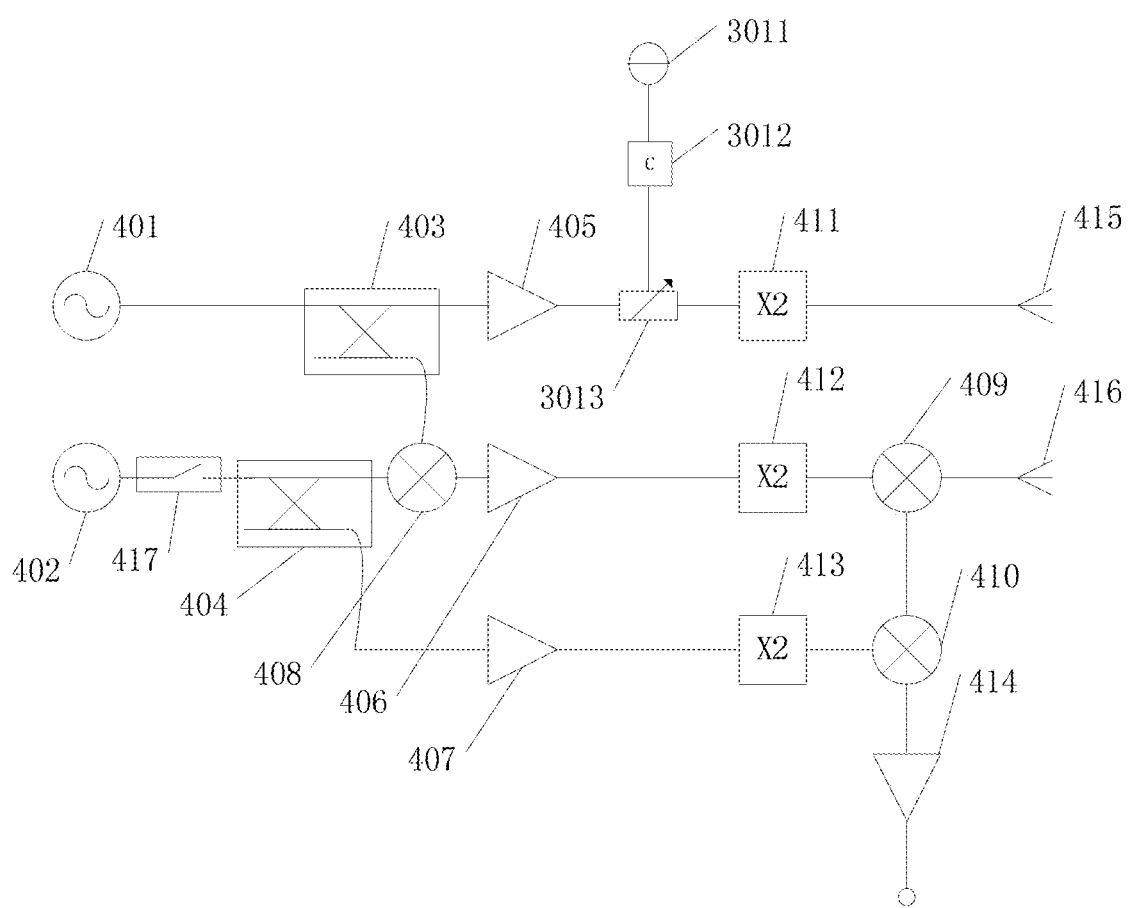
FIG. 4 is a detailed structure diagram of a millimeter wave transceiver of FIG. 3 in one of the exemplary embodiments.

In one exemplary embodiment, as shown in FIG. 4, the millimeter wave transceiver 302 may comprise a first signal source 401, a second signal source 402, a first directional coupler 403, a second directional coupler 404, a first power amplifier 405, a second power amplifier 406, a third power amplifier 407, a first frequency mixer 408, a second frequency mixer 409, a third frequency mixer 410, a first frequency doubler 411, a second frequency doubler 412, a third frequency doubler 413, a low noise amplifier 414, a transmitting antenna 415 and a receiving antenna 416;

the first power amplifier 405, the adjustable power attenuator 2013, the first frequency doubler 411 and the transmitting antenna 415 are sequentially connected;

an input end of the first directional coupler 403 is connected to an output end of the first signal source 401, a straight-through end of the first directional coupler 403 is connected to an input end of the first power amplifier 405, and a coupling end of the first directional coupler 403 is connected to a radio frequency end of the first frequency mixer 408;

an intermediate frequency end of the first frequency mixer 408 is connected to a straight-through end of the second directional coupler 404, an input end of the second directional coupler 404 is connected to an output end of the second signal source 402, a local oscillator end of the first frequency mixer 408 is connected to an input end of the second power amplifier 406, an output end of the second power amplifier 406 is connected to an input end of the second frequency doubler 412, an output end of the second frequency doubler 412 is connected to a local oscillator end of the second frequency mixer 409, and a radio frequency end of the second frequency mixer 409 is connected to the receiving antenna; and a coupling end of the second directional coupler 404 is connected to an input end of the third power amplifier 407, an output end of the third power amplifier 407 is connected to an input end of the third frequency doubler 413, an output end of the third frequency doubler 413 is connected to a local oscillation end of the third frequency mixer 410, a radio frequency end of the third frequency mixer 410 is connected to an intermediate frequency end of the second frequency mixer 409, and an intermediate frequency end of the third frequency mixer 410 is connected to the low noise amplifier 414.

In specific implementation, the first signal source 401 may be a signal source with a working frequency of 17.5-22.5 GHz, and the second signal source 402 may be a voltage-controlled oscillator with a working frequency of 50 MHz. It can be seen from the composition and connection relation of the millimeter wave transceiver 302 that the first directional coupler 403 is a three-port device, and the straight-through end thereof is input to the first power amplifier 405; after passing through the adjustable power attenuator 3013, the power of the present link (millimeter wave signal transmitting link) reaches the safe input power range of the first frequency doubler 411; and after passing through the first frequency doubler 411, the input power of the present link is multiplied to 35-45 GHz, and finally radiated to a detected target by the transmitting antenna 415. The first frequency mixer 308 is also a three-port device, the intermediate frequency end thereof is connected to the straight-through end of the second directional coupler 404 to input an intermediate frequency signal of 50 MHz, the radio frequency end thereof is connected to the coupling end of the first directional coupler 303 to input a signal of 17.5-22.5 GHz, and the local oscillator end thereof outputs a difference frequency signal of the radio frequency signal (signal of 17.5-22.5 GHz) and the intermediate frequency signal (intermediate frequency signal of 50 MHz) and then inputs the difference frequency signal to the second power amplifier 406, so that the signal power thereof is amplified to be within the safe working range of the second frequency doubler 412.

The third frequency mixer 410 outputs a downconverted signal with target information, the local oscillator end thereof is input a 100 MHz continuous wave signal, which is emitted by the second signal source through the coupling end of the second directional coupler 404, the third power amplifier 407, and the third frequency doubler 413, and the intermediate frequency end thereof outputs a second downconverted signal with the target information. The low noise amplifier 414 amplifies the weak intermediate frequency signal which is generated by executing downconversion twice to improve the signal-to-noise ratio and detection sensitivity of the output signal.

It should be noted that FIG. 4 shows a preferred structure of the millimeter wave transceiver 302, and the millimeter wave transceiver may include only one part of the components shown in FIG. 4 according to requirements.

In addition, as shown in FIG. 4, a single-pole multi-throw switch 417 may be connected between the second signal source 402 and the second directional coupler 404, so that switching among a plurality of millimeter wave transceivers 302 can be realized through one single-pole multi-throw switch 417. For example, the single-pole multi-throw switch 417 may be a single-pole eight-throw switch, so that switching among the eight millimeter wave transceivers 302 can be realized through one single-pole eight-throw switch.

In addition, in order to realize switching among more millimeter wave transceivers 302 with a few of switches, in one exemplary embodiment, the plurality of millimeter wave transceivers 302 are controlled by a two-layer single-pole multiple-throw switch. Specifically, the two-layer single-pole multi-throw switch is connected between the second signal source 402 and the second directional coupler 402. The two-layer single-pole multi-throw switch can realize $n^2$ switch combinations, wherein n represents the throw number. For example, the two-layer single-pole eight-throw switch has a throw number of 8, so that 64 switch combinations can be realized; therefore, switching between 64 millimeter wave transceivers 202 can be realized through the two-layer single-pole eight-throw switch, and the 64 millimeter wave transceivers do not work at the same time, but are controlled by the two-layer single-pole eight-throw switch to transmit and receive one by one.

Figure 5:
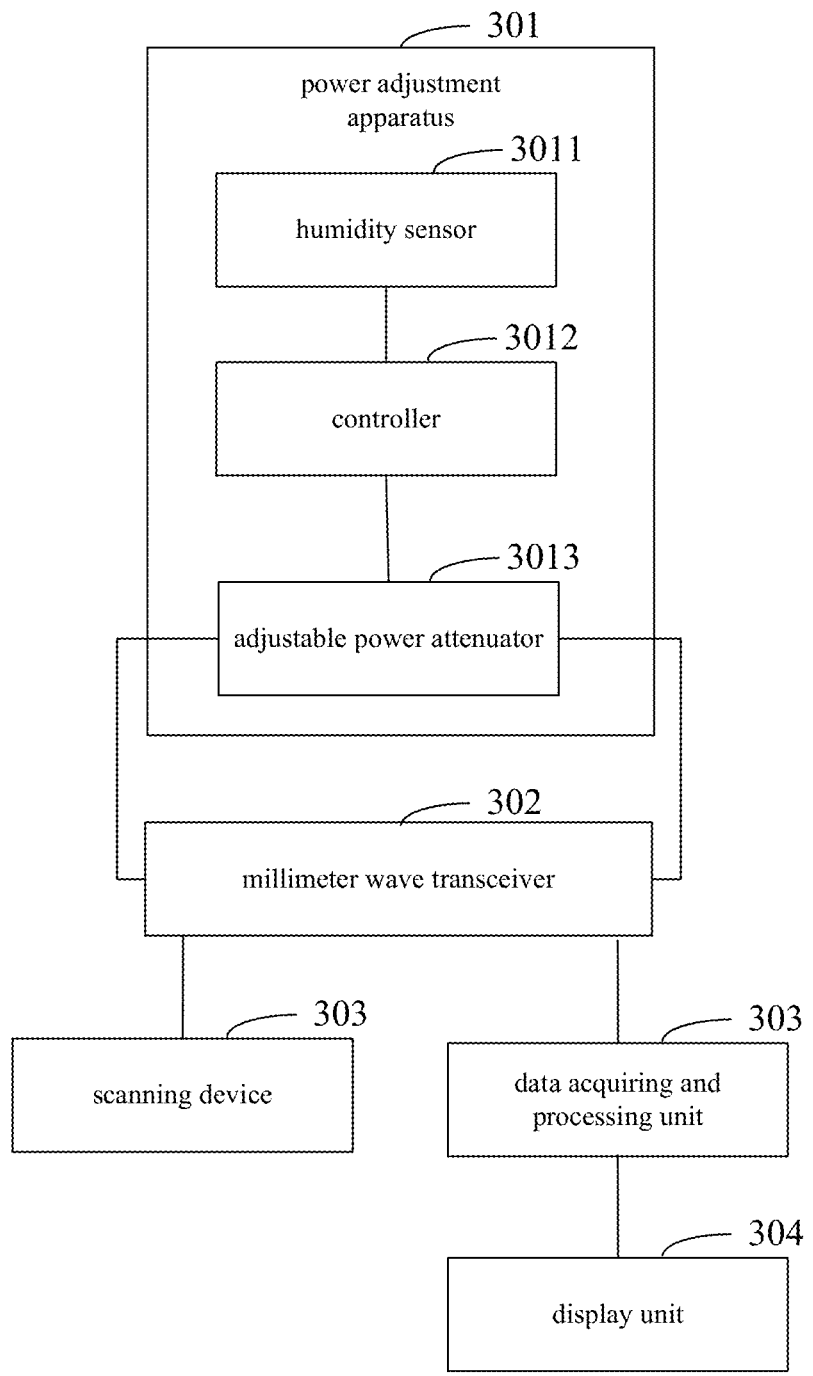
FIG. 5 is a second structure diagram of the human body security check device according to exemplary embodiment 3 of the present disclosure.
Figure 6:
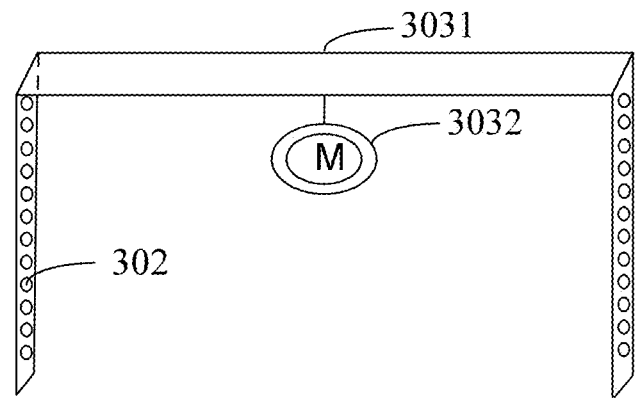
FIG. 6 is a schematic diagram showing the detailed structure of a scanning device in FIG. 5 and the positional relationship with a millimeter wave transceiver.

In one exemplary embodiment, as shown in FIG. 5, the human body security check device of the disclosure may further comprise a scanning device 303. As shown in FIG. 6, the scanning device 303 comprises a cantilever 3031 and a driving motor 3032. The millimeter wave transceiver 302 is hung at an end of the cantilever 3031, and the driving motor drives the cantilever to move in a circle so as to detect the front and back of the detected target. Specifically, the plurality of millimeter wave transceivers 302 may be vertically arranged in two columns, and the two columns of millimeter wave transceivers 302 are hung at two ends of the cantilever 3031 respectively.

Further, as shown in FIG. 5, the human body security check device of the disclosure may further comprise a data acquiring and processing unit 304 and an image display unit 305. The data acquiring and processing unit 304 is connected to the millimeter wave transceiver 302 and the image display unit 305, and the data acquiring and processing unit 304 is used for acquiring an echo signal from the millimeter wave transceiver 302, performing Fourier transform of geometric characteristics on the acquired echo signal, simplifying and deforming the resulting data of Fourier transform, then performing inverse Fourier transform to obtain a target three-dimensional image, and transmitting the target three-dimensional image to the image display unit for display. Fourier transform of geometric characteristics, simplification and deformation of the result data of Fourier transform, and inverse Fourier transform can all be implemented by existing methods, which will not be described in detail here.

Figure 7:
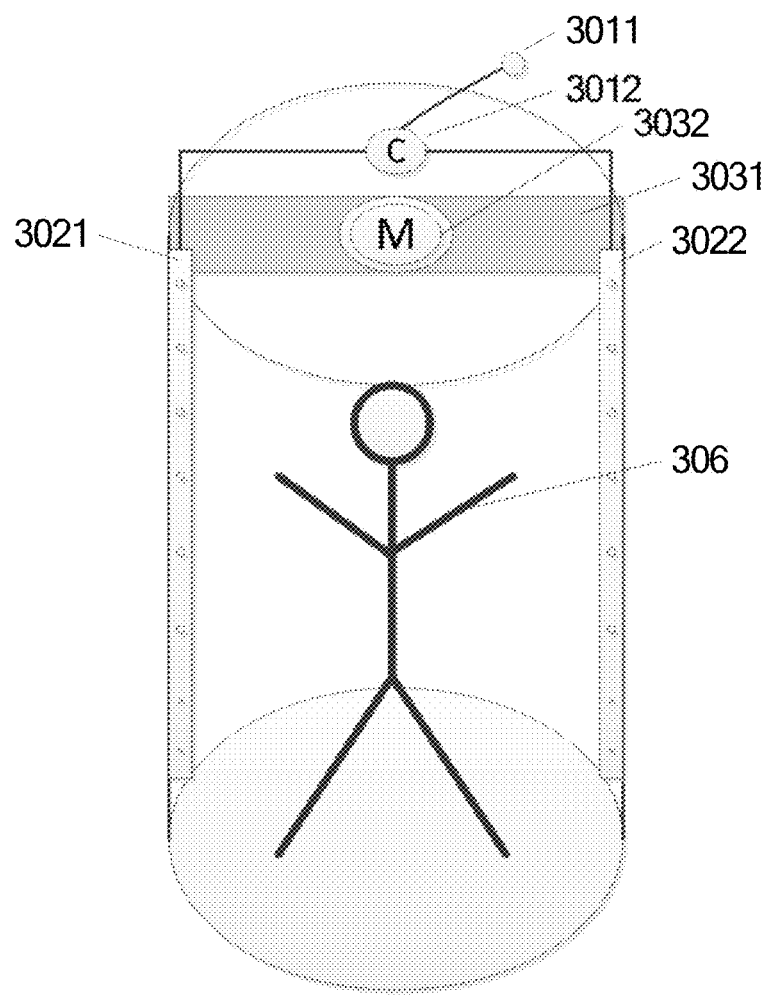
FIG. 7 is an application schematic diagram of the human body security check device according to exemplary embodiment 3 of the present disclosure.

During specific operation, after the human body security check device of the disclosure has been put into use, as shown in FIG. 7, the detected target 306 (e.g., a person) is located in an area to be detected of the human body security check device. The driving motor 3032 and the cantilever 3041 can be arranged on the top of the human body security check device, and a row of millimeter wave transceivers 3021 and 3022 are hung at two ends of 3041 respectively. The driving motor 3032 drives the millimeter wave transceivers 3021 and 3022 to move in a circle to scan the front and back of the detected target (306). The millimeter wave transceivers 3021 and 3022 radiate the millimeter wave signal to the detected target 306, the detected target 306 returns electromagnetic waves (called echo signal) with target information, and the echo signal is processed by the data acquiring and processing unit 304 to generate a three-dimensional image of the detected target 306 for display on the image display unit 305.

The technical features of the above-described exemplary embodiments can be combined freely, and all possible combinations of the technical features in the above-described embodiments are not described for simplicity of description. However, as long as there is no contradiction between the combinations of these technical features, they should be considered within the scope of this specification.

The above-mentioned exemplary embodiments only describe several implementations of the present disclosure in a specific and detailed way, but it is not to be understood as limiting the scope of the disclosure. It should be noted that it is within the scope of the present disclosure for a person of ordinary skill in the art to make several modifications and improvements without departing from the concept of the present disclosure.

What is claimed is:

1. A power adjustment method applied in a human body security check device or an inspection device provided with a millimeter wave transceiver, comprising:
   obtaining a current humidity value by detecting an ambient humidity around the millimeter wave transceiver using a preset humidity sensor;
   determining a target power attenuation value of an adjustable power attenuator according to the current humidity value, a sum of the target power attenuation value and a power attenuation value of a millimeter wave signal caused by the ambient humidity being a constant value; and
   controlling the adjustable power attenuator to adjust a power attenuation value of the adjustable power attenuator to be consistent with the target power attenuation value;
   wherein the adjustable power attenuator is provided in a millimeter wave signal transmitting link of the millimeter wave transceiver;
   wherein the step of determining the target power attenuation value of the adjustable power attenuator according to the current humidity value comprises:
   determining the power attenuation value of the millimeter wave signal caused by the ambient humidity according to $P_{pad1}=ax+b$, and determining the target power attenuation value of the adjustable power attenuator according to $P_{pad1}+P_{pad2}=C$, wherein $P_{pad1}$ refers to the power attenuation value of the millimeter wave signal caused by the ambient humidity, x refers to the current humidity value, $P_{pad2}$ refers to the target power attenuation value, C refers to a total power attenuation value, and both a and b are constants;

or according to the current humidity value and corresponding relations between a preset humidity value and the power attenuation value of the adjustable power attenuator, searching for the target power attenuation value corresponding to the current humidity value.

2. A power adjustment apparatus applied in a human body security check device or an inspection device provided with a millimeter wave transceiver, comprising: a humidity sensor, a power controller and an adjustable power attenuator, wherein the adjustable power attenuator is provided in a millimeter wave signal transmitting link of the millimeter wave transceiver;

the humidity sensor is configured to detect an ambient humidity around the millimeter wave transceiver to obtain a current humidity value;

the power controller is configured to determine a target power attenuation value of the adjustable power attenuator according to the current humidity value and control the adjustable power attenuator to adjust a power attenuation value of the adjustable power attenuator to be consistent with the target power attenuation value; and a sum of the target power attenuation value and a power attenuation value of a millimeter wave signal caused by the ambient humidity is a constant value;

wherein:

the power controller is configured to determine the power attenuation value of the millimeter wave signal caused by the ambient humidity according to $P_{pad1}=ax+b$, and determine the target power attenuation value of the adjustable power attenuator according to $P_{pad1}+P_{pad2}=C$, wherein $P_{pad1}$ refers to the power attenuation value of the millimeter wave signal caused by the ambient humidity, x refers to the current humidity value, $P_{pad2}$ refers to the target power attenuation value, C refers to a total power attenuation value, and both a and b are constants;

or the power controller is configured to search for the target power attenuation value corresponding to the current humidity value according to the current humidity value and corresponding relations between a preset humidity value and the power attenuation value of the adjustable power attenuator.

3. A human body security check device, comprising a millimeter wave transceiver and a power adjustment apparatus, wherein the power adjustment apparatus comprises a humidity sensor, a power controller and an adjustable power attenuator, the power controller is connected to the humidity sensor and the adjustable power attenuator, and the adjustable power attenuator is provided in a millimeter wave signal transmitting link of the millimeter wave transceiver;

the humidity sensor is configured to detect an ambient humidity around the millimeter wave transceiver to obtain a current humidity value;

the power controller is configured to determine a target power attenuation value of the adjustable power attenuator according to the current humidity value and control the adjustable power attenuator to adjust its power attenuation value to be consistent with the target power attenuation value; and a sum of the target power attenuation value and a power attenuation value of a millimeter wave signal caused by the ambient humidity is a constant value;

wherein:

the power controller is configured to determine the power attenuation value of the millimeter wave signal caused by the ambient humidity according to $P_{pad1}=ax+b$, and determine the target power attenuation value of the adjustable power attenuator according to $P_{pad1}+P_{pad2}=C$, wherein $P_{pad1}$ refers to the power attenuation value of the millimeter wave signal caused by the ambient humidity, x refers to the current humidity value, $P_{pad2}$ refers to the target power attenuation value, C refers to a total power attenuation value, and both a and b are constants;

or the power controller is configured to search for the target power attenuation value corresponding to the current humidity value according to the current humidity value and corresponding relations between a preset humidity value and the power attenuation value of the adjustable power attenuator.

4. The human body security check device according to claim 3, wherein the millimeter wave transceiver comprises a first signal source, a second signal source, a first directional coupler, a second directional coupler, a first power amplifier, a second power amplifier, a third power amplifier, a first frequency mixer, a second frequency mixer, a third frequency mixer, a first frequency doubler, a second frequency doubler, a third frequency doubler, a low noise amplifier, a transmitting antenna and a receiving antenna;

the first power amplifier, the adjustable power attenuator, the first frequency doubler and the transmitting antenna are sequentially connected, an input end of the first directional coupler is connected to an output end of the first signal source, a straight-through end of the first directional coupler is connected to an input end of the first power amplifier, and a coupling end of the first directional coupler is connected to a radio frequency end of the first frequency mixer;

an intermediate frequency end of the first frequency mixer is connected to a straight-through end of the second directional coupler, an input end of the second directional coupler is connected to an output end of the second signal source, a local oscillator end of the first frequency mixer is connected to an input end of the second power amplifier, an output end of the second power amplifier is connected to an input end of the second frequency doubler, an output end of the second frequency doubler is connected to a local oscillator end of the second frequency mixer, and a radio frequency end of the second frequency mixer is connected to the receiving antenna; and a coupling end of the second directional coupler is connected to an input end of the third power amplifier, an output end of the third power amplifier is connected to an input end of the third frequency doubler, an output end of the third frequency doubler is connected to a local oscillation end of the third frequency mixer, a radio frequency end of the third frequency mixer is connected to an intermediate frequency end of the second frequency mixer, and an intermediate frequency end of the third frequency mixer is connected to the low noise amplifier.

5. The human body security check device according to claim 4, wherein the first signal source is a signal source with a working frequency of 17.5-22.5 GHz, or/and the second signal source is a voltage-controlled oscillator with a working frequency of 50 MHz.

6. The human body security check device according to claim 4, wherein a single-pole multi-throw switch or a double-layer single-pole multi-throw switch is connected between the second signal source and the second directional coupler.

7. The human body security check device according to claim 3, further comprising a scanning device, wherein the scanning device comprises a cantilever and a driving motor, the millimeter wave transceiver is hung at an end of the cantilever, and the driving motor drives the cantilever to move in a circle.

8. The human body security check device according to claim 3, further comprising a data acquiring and processing unit and an image display unit, wherein the data acquiring and processing unit is connected to the millimeter wave transceiver and the image display unit; and the data acquiring and processing unit is configured to acquire an echo signal from the millimeter wave transceiver, perform Fourier transform of geometric characteristics on the acquired echo signal, simplify and deform the result data of Fourier transform, then perform inverse Fourier transform to obtain a target three-dimensional image, and transmit the target three-dimensional image to the image display unit for display.

* * * * *